3,222,278
METHOD FOR IMPROVING THE YIELD OF AN ATTAPULGITE CLAY
Paul D. Harryman, Texas City, and David T. Oakes, Dickinson, Tex., assignors to Monsanto Company, a corporation of Delaware
No Drawing. Filed Apr. 20, 1962, Ser. No. 188,959
12 Claims. (Cl. 252—8.5)

The present invention relates to the treatment of clays and, more particularly, to the beneficiation of a specific type of clay, namely, attapulgite clay, by chemical treatment to render it especially useful in the production of well drilling muds.

Drilling of an oil or gas well by the rotary method is performed by rotating a bit attached to the end of a hollow drill pipe, known as a drill stem, which extends downwardly through the well bore. As the drill stem is rotated from the surface, the bit cuts or grinds away the formation into small fragments known as cuttings which must be removed from the hole in order that the drilling may progress. To carry away these cuttings, a fluid commonly referred to as drilling mud is continuously pumped down the drill stem, through channels in the drill bit itself, and then up through the annular space between the drill stem and the walls of the borehole to the surface of the earth. In addition to the primary function of picking up the cuttings produced by the drill bit and carrying them to the surface, the drilling mud serves a number of other purposes. It must lubricate and cool the drill stem and bit; it must apply a hydrostatic pressure to the formation to counterbalance the pressure of any liquids or gases which may be encountered in the various strata penetrated by the drill bit in order to prevent flow of formation fluid into the borehole; and it must form on the walls of the borehole a thin impervious layer or sheath of solid material which serves to reduce loss of fluid from the borehole to the formation and provides support for the walls to prevent their collapse into the drill hole.

Drilling fluids or muds of this character are usually prepared from clay minerals having gel-forming characteristics. Clays generally used for this purpose are of several general types: Wyoming or bentonitic clays, native or sub-bentonitic clays and attapulgite clay. The choice of a particular clay insofar as mud preparation is concerned depends primarily upon its yield value but also upon the drilling locale in which it is to be used. The yield of clay is defined as the number of barrels (42 gallons per barrel) of aqueous dispersion or mud having a viscosity of 15 centipoises which can be prepared from a ton of clay. Generally speaking, a yield of at least 90 barrels of 15-centipoise mud per ton of clay is the minimum standard for acceptable material. Such a yield can be expected with the purer forms of sodium bentonite such as Wyoming bentonite but is not attained with less pure forms, with the calcium and other meta- and sub-bentonites or with attapulgite clays. Clays of the bentonitic type, however, can be upgraded by chemical treatment with so-called beneficiating agents. The incorporation in such clays of organic polymers such as, for example, certain olefin-maleic anhydride interpolymers, results in increasing the yield obtainable from the low-yield bentonitic and sub-bentonitic clays so as to increase their utility as mud-making materials while at the same time use of these same agents makes possible further enhancement in the yield value of so-called "high yield" clays. This is usually accomplished by adding the agents to the clay as the same is being ground. The resulting dry product can then be sacked in a conventional manner after drying if required. Or, the clay and beneficiating agents are separately added to water to form a slurry, the agent and clay being added in any desired order. This type of wet mixing is employed, for example, at the well site but is not preferred. Beneficiation in the dry form prior to sacking the clay is preferred because it permits closer quality control and a more uniform product although the ultimate effectiveness of the agent is not affected by the manner of its addition when used with bentonitic-type clays.

The same situation does not prevail, however, with attapulgite clay. This type of clay is particularly useful in drilling muds where brine, i.e., water saturated or nearly saturated with salt, is employed as the dispersing medium of the drilling mud. It also finds extensive use in areas in which rock salt is penetrated which causes an increase in the salinity of the mud. In such cases, the bentonitic type clays which require swelling in water to develop their colloidal properties fail to swell and virtually complete loss of gel strength and viscosity is the usual result. Attapulgite is a unique clay material in that its crystalline structure is needle-like in shape rather than plate-like as in the case of bentonite. The needle-like shape is believed responsible for the high colloidal stability of attapulgite in the presence of salt water or other electrolytes. The formation of a brushheap structure prevents loss of surface area and consequent collapse of colloidal properties. But the yield value of most attapulgite clays is not acceptable for commercial drilling operations and beneficiation with agents such as those employed for upgrading bentonitic clays has heretofore been unsuccessful. Up to now, for example, it has not been possible to treat attapulgite clays with olefin-maleic anhydride interpolymers and obtain any significant increase in yield value. It has now been discovered, however, that this clay can be beneficiated by means of olefin-maleic anhydride interpolymers to make it highly acceptable for use in the preparation of drilling muds if the method of treatment is carried out in a particular specified manner.

It is an object of the present invention, therefore, to provide a method for beneficiating an attapulgite clay so as to increase its yield value.

It is a further object of the invention to provide a method and means for improving the mud-forming characteristics of clays used to make well drilling muds wherein the dispersing medium of the mud is salt water and more especially for increasing the yield of mud obtainable from such materials.

Another object of the invention is to provide a composition for use in making drilling muds from attapulgite clays whereby higher yields of mud are possible than could be obtained heretofore from raw materials of the same quality.

Other objects and advantages of the invention will become apparent from the following description thereof.

In accordance with the invention, the yield of attapulgite clay is increased by dispersing and partially or completely hydrating said attapulgite clay in an aqueous medium to form a viscous slurry and thereafter adding to said dispersion a minor amount of a water-soluble interpolymer comprising an olefin having 2 to 4 carbon atoms and maleic anhydride. In other words, the dispersion of attapulgite clay in water must be prepared first and then aged for a time sufficient to at least partially hydrate the clay before the interpolymer treating agent is added to the slurry if any beneficiating effect is to be obtained from the interpolymer. In general, the aging period may vary from as little as 30 minutes to about 30 hours. Preferably, an aging period of from about 2 to about 24 hours is employed.

The following examples are presented to illustrate the invention but are not to be construed as limiting it in any manner whatsoever.

Example 1

Approximately 20-g. samples of an attapulgite clay (a clay supplied by the Baroid Division of National Lead Company, Houston, Texas, and known under the trade name "Zeogel") were added to 350-ml. quantities of saturated brine containing various concentrations of a dissolved interpolymer of ethylene and maleic anhydride in the sodium salt form having a specific viscosity of 1.82. For convenience, a 0.25% aqueous solution of the ethylene-maleic anhydride copolymer was prepared and this solution was added from a burette to the saturated brine to obtain the desired concentration. Four ml. of the solution represented a treatment level of one pound per ton. The resulting suspensions were mixed in a Hamilton-Beach mixer for 15 minutes. Immediately after mixing, the viscosity of the slurry was determined using a Fann viscosimeter and recorded. The mixture was then covered and allowed to stand for a period of 24 hrs. After this aging, the mixture was again subjected to agitation for five minutes in a Hamilton-Beach mixer and the viscosity of the slurry was again determined. Yield values were estimated from the viscosimeter dial readings by means of graphs prepared from a collection of such readings. Results recorded in Table I below demonstrate that practically no beneficiation of the clay was obtained at all when the treating agent, ethylene-maleic anhydride interpolymer, was added simultaneously with the clay and brine according to the standard operating practice.

TABLE I

| Interpolymer Additive (lb./ton) | Viscosity (cp.) (15 Min.) | Estimated Yield (bbl./ton) | Viscosity (cp.) (24 Hr.) | Estimated Yield (bbl./ton) |
|---|---|---|---|---|
| 0 | 7.75 | 66 | 10.25 | 78 |
| 1.25 | 8.0 | 67 | 10.50 | 78 |
| 2.5 | 8.25 | 68 | 9.25 | 77 |
| 5.0 | 8.25 | 68 | 9.75 | 77 |
| 7.5 | 9.0 | 70 | 10.0 | 78 |
| 10.0 | 8.25 | 68 | 9.5 | 77 |
| 25.0 | 9.75 | 72 | 10.5 | 78 |

Example 2

A sample of the attapulgite clay of Example 1 was dispersed in 350 ml. of saturated brine by mixing in a Hamilton-Beach mixer for about 15 minutes. The clay dispersion was then covered and allowed to stand for a period of about 24 hours. At the end of this static aging period, varying amounts of a 0.25% aqueous solution of an interpolymer of ethylene and maleic anhydride having a specific viscosity of 1.2 were added to the clay slurry. After each addition, the slurry was mixed in the Hamilton-Beach mixer for 3 minutes after which its viscosity was determined with a Fann viscosimeter. As in Example 1, yield values of the clay slurry at the various treating levels were calculated from the viscosimeter dial readings by means of graphs. Results obtained are presented in Table II below. These effectively demonstrate that when attapulgite clay is first hydrated or partially hydrated by dispersing it in water before the ethylene-maleic anhydride interpolymer is added to it, a significant upgrading or increase in yield value is obtained.

TABLE II

| Interpolymer additive (lb./ton): | Yield value (bbl./ton) |
|---|---|
| 0 | 69 |
| 0.5 | 84 |
| 1.0 | 91 |
| 1.5 | 97 |
| 2.0 | 113 |

Example 3

A 20-g. sample of the Zeogel used in the previous examples was dispersed in saturated brine containing an amount equivalent to 7.5 pounds per ton of clay of an interpolymer consisting of substantially equimolar proportions of ethylene and maleic anhydride and about 1% by weight of diallyl ether in its sodium salt form having a specific viscosity of approximately 3.34. The resulting suspension was mixed in a Hamilton-Beach mixer for 15 minutes. Immediately after mixing, the viscosity of the slurry was determined using a Fann viscosimeter and recorded. The yield value of the clay estimated from the viscosimeter dial reading was 78, a value identical to that obtained in Example 1 where no treating agent was employed.

Example 4

Another 20-g. sample of the same attapulgite clay of Example 3 was dispersed in 350 ml. of saturated brine by mixing in a Hamilton-Beach mixer for about 15 minutes. The clay dispersion was then covered and allowed to stand for a period of about 24 hours. At the end of this static aging period, varying amounts of an interpolymer of ethylene, maleic anhydride and diallyl ether of the same composition as that in Example 3 and having a specific viscosity of approximately 2.5 were added to the clay slurry. After each addition, the slurry was mixed in a Hamilton-Beach mixer for 15 minutes after which its viscosity was determined with a Fann viscosimeter. As in the previous examples, yield values of the clay slurry at the various treating levels were estimated from the viscosimeter dial readings and are presented in Table III below. These provide convincing evidence that significant up-grading or increase in yield of attapulgite clay can be obtained by treatment with interpolymers of ethylene, maleic anhydride and diallylether, provided the clay is first hydrated by dispersing it in water before the treating agent is added to it.

TABLE III

| Interpolymer additive (lb./ton): | Yield value (bbl./ton) |
|---|---|
| 0 | 67 |
| 0.5 | 79 |
| 1.0 | 86 |
| 1.5 | 92 |
| 2.0 | 98 |

While the method of the invention is directed particularly to the use of the salt forms of the olefin-maleic anhydride interpolymers disclosed, it is also useful with the anhydride form of the interpolymers. However, it is not absolutely necessary when the anhydride form is employed as it is with the salt forms to use the technique of the invention. It has been determined that because of the slow rate of solubility of the anhydride form, an aging period is automatically provided in which the clay becomes hydrated prior to the dissolution of the interpolymer in the aqueous dispersion medium. Hence, the manner of addition of clay and polymer is not critical in this instance.

The amount of the interpolymers needed for treatment varies and depends to some extent on the degree of beneficiation desired, but generally only very small quantities are required. Amounts within the range from about 0.1 to about 10 lb. per ton of clay will produce satisfactory results. The preferred quantities for treatment are from about 1.0 to 3.5 lb./ton of clay.

The interpolymers useful as clay beneficiating agents are those having a specific viscosity of at least 0.3, it being understood that the specific viscosity value is that determined at 25° C. on a 1% solution (by weight) of the anhydride form of the interpolymer in dimethylformamide. It is difficult to establish any one preferred range of specific viscosity for the interpolymers since this is a factor which varies somewhat depending upon the particular interpolymer employed as the treating agent, the specific clay being treated, etc. With some attapulgite clays, for example, optimum results are achieved with an interpolymer having a specific viscosity in the range from about 0.6 to about 2.0 while with others an interpolymer with a specific viscosity in the range from about 1.0 to about 3.0 produces the best results.

Both linear and cross-linked interpolymers of olefins having 2–4 carbon atoms and maleic anhydride are suitable as clay beneficiating agents in the practice of the invention. Suitable cross-linking agents for preparing useful interpolymer compositions include allyl and vinyl esters of olefinically unsaturated carboxylic acids having from 3 to 24 carbon atoms such as the allyl and vinyl esters of acrylic acid, methacrylic acid, crotonic acid, isocrotonic acid, vinylacetic acid, allylacetic acid, 2-pentenoic acid, 3-methyl-2-hexenoic acid, 2-heptenoic acid, 4-ethyl-2-octenoic acid, 2-nonenoic acid, 9-decylenic acid, stillingic acid, 9-dodecylenic acid, palmitoleic acid, oleic acid, ricinoleic acid, petroselenic acid, vaccenic acid, linoleic acid, linolenic acid, eleostearic acid, licanic acid, parianaric acid, gadoleic acid, arachidonic acid, cetoleic acid, erucic acid, nervonic acid, etc. Other allyl and vinyl esters suitable as cross-linking agents are the allyl, diallyl, vinyl or divinyl esters of unsaturated carboxylic acids such as the allyl and vinyl maleates, diallyl and divinyl maleates, allyl and vinyl fumarates, diallyl and diviny fumarates, allyl and vinyl itaconates, diallyl and divinyl itaconates, allyl and vinyl citraconates, diallyl and divinyl citraconates, allyl and vinyl mesaconates, diallyl and divinyl mesaconates, allyl and vinyl glutaconates, diallyl and divinyl glutaconates, and the like. Still other suitable cross-linking agents which can be interpolymerized with maleic anhydride and olefins having two to four carbon atoms to yield interpolymers useful in the method of clay beneficiation of the present invention are diallyloxy hydrocarbons such as 1,4-diallyloxybutene-2, 1,10-diallyloxydecane, 1,5-diallyloxypentene-2, 1,6-diallyloxyhexane, 1,8-diallyloxyoctene-2, 1,12-diallyloxydodecene-3 and the like; and $\alpha,\omega$-diolefins having from 7 to 22 carbon atoms such as heptadiene-1,6, nonadiene-1,8, decadiene-1,9, dodecadiene-1,11, pentadecadiene-1,14, hexadecadiene-1,15 and the like.

The amount of cross-linking agent employed depends to some extent upon the olefin employed but generally lies in the range between about 0.1 and 5.0% by weight of the total polymerization mixture.

The interpolymers used as clay beneficiating agents in the practice of this invention are readily prepared by polymerizing a mixture of maleic anhydride, a $C_2$–$C_4$ olefin, that is, ethylene, propylene, n-butylene or isobutylene, and the cross-linking agent if one is desired. The polymerization is carried out in an inert organic solvent, preferably a non-polymerizing hydrocarbon solvent, having solvating action on the monomers but little appreciable solvent or swelling action on the interpolymer produced. In this way, the polymer is obtained in the form of a fine powder which only requires freeing from solvent before use. Suitable solvents include, for example, ethylene dichloride, ethyl acetate, dioxane and, particularly, aromatic hydrocarbons such as benzene, toluene and xylene.

While the olefin and maleic anhydride react in substantially equimolar proportions, in the usual method for producing the interpolymers, the olefin is employed in excess. The anhydride, or the anhydride and the cross-linking agent when one is used, in the desired proportions is charged to the reactor dissolved in the solvent and the reactor is then brought up to the desired pressure by charging the olefin. Operating pressure is thereafter maintained by continuous charging of olefin throughout the reaction period. The monomers are preferably dissolved in an amount of solvent such that the solids content of the reaction slurry formed is about 15%. This ordinarily represents an amount of solvent about six times the total weight of the compounds to be polymerized. The amount of solvent is not critical, however, and proportions of solvent as much as 10 or 20 times the weight of the olefin and maleic anhydride may be used. Alternatively, the cross-linking agent may be added to the mixture of anhydride and olefin during the course of the polymerization either over part or all of the polymerization period. The resulting solution is mixed thoroughly and heated sufficiently so that the polymerization reaction takes place.

An organic solvent-soluble catalyst is necessary. Any of the organic free-radical-catalysts is satisfactory. Among these are various organic solvent-soluble peroxygen compounds including benzoyl peroxide, capryl peroxide, acetyl peroxide, acetyl benzoyl peroxide, di-tert-butyl peroxide and others, azoisobutyronitrile, dimethyl azoisobutyrate and many others. Mixtures of such catalysts are also suitable. Radiation polymerization can be used, too, e.g., such high-energy radiation sources as X-rays, $\gamma$-rays, neutrons and the like can be used to initiate polymerization.

The polymerization can be carried out at a temperature within the range from 0° C. to 100° C. with optimum temperatures varying with the particular $C_2$–$C_4$ olefin employed. Preferred temperatures lie for the most part in the range from 40° C. to 80° C. Pressure may vary from atmospheric to about 600 p.s.i.g. or higher depending upon the particular olefin used.

At the completion of the polymerization reaction, the interpolymer is recovered from the organic solvent by any suitable means.

While the interpolymers may be used in the anhydride or acid form, they are more commonly employed as clay beneficiating agents in the form of their alkali metal or ammonium salts. Alkali metal or ammonium salts of the interpolymers such as sodium, potassium, lithium, rubidium and caesium salts may be obtained by reacting the interpolymers with the stoichiometric amount of the corresponding hydroxide. Partial salts may, of course, be produced by using less than the quantity of alkali required to effect complete conversion of the carboxyl groups. When polymer anhydrides are reacted with anhydrous ammonia, an appreciable amount of amide groups are formed resulting in mixed ammonium-amide polymeric salts.

What is claimed is:

1. The method of improving the yield of an attapulgite clay which comprises dispersing said clay in an aqueous medium, aging said dispersion for a period of time sufficient to at least partially hydrate said clay, and thereafter adding to said dispersion an amount sufficient to increase the yield of said clay of a water-soluble interpolymer comprising an olefin having 2 to 4 carbon atoms and maleic anhydride, said interpolymer having a specific viscosity of at least 0.3.

2. The method of claim 1 wherein said interpolymer is in the form of its sodium salt.

3. The method of claim 2 wherein the amount of interpolymer added is in the range from about 0.1 pound to about 10 pounds per ton of said clay.

4. The method of claim 3 wherein said aging is effected over a period of time from about 30 minutes to about 30 hours.

5. The method of improving the yield of an attapulgite clay which comprises dispersing said clay in an aqueous medium, aging said dispersion for a period of time to at least partially hydrate said clay, and thereafter adding to said dispersion an amount from about 0.1 pound to about 10 pounds per ton of said clay of an interpolymer consisting of substantially equimolar proportions of an olefin having from 2 to 4 carbon atoms and maleic anhydride, said interpolymer having a specific viscosity of at least 0.3.

6. The method of claim 5 wherein said aqueous medium is a saturated brine.

7. The method of claim 6 wherein said interpolymer is in the form of its sodium salt.

8. The method of claim 7 wherein said aging is effected over a period of time from about 30 minutes to about 30 hours.

9. The method of improving the yield of an attapulgite clay which comprises dispersing said clay in an aqueous medium, aging said dispersion for a period of time to at least partially hydrate said clay, and thereafter adding to said dispersion an amount from about 0.1 pound to about 10 pounds per ton of said clay of an interpolymer consisting of substantially equimolar proportions of ethylene and maleic anhydride and from about 0.1% to about 5% by weight of diallyl ether, said interpolymer having a specific viscosity of at least 0.3.

10. The method of claim 9 wherein said aqueous medium is a saturated brine.

11. The method of claim 10 wherein said interpolymer is in the form of its sodium salt.

12. The method of claim 11 wherein said aging is effected over a period of time from about 30 minutes to about 30 hours.

References Cited by the Examiner

UNITED STATES PATENTS

| | | | |
|---|---|---|---|
| 2,948,678 | 8/1960 | Turner et al. | 252—8.5 |
| 3,070,543 | 12/1962 | Scott | 252—8.5 |
| 3,070,544 | 12/1962 | Johnson et al. | 252—8.5 |

OTHER REFERENCES

Rogers, Composition and Properties of Oil Well Drilling Fluids, revised ed., pub. 1953 by Gulf Pub. Co. of Houston, Texas, pages 221 to 224.

JULIUS GREENWALD, *Primary Examiner.*